(12) United States Patent
Blackwood

(10) Patent No.: US 11,461,346 B2
(45) Date of Patent: Oct. 4, 2022

(54) MANAGING TEMPORAL VIEWS OF DATA

(71) Applicant: AT&T Intellectual Property I, L.P., Atlanta, GA (US)

(72) Inventor: Philip Blackwood, Red Bank, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/836,572

(22) Filed: Mar. 31, 2020

(65) Prior Publication Data

US 2021/0303565 A1 Sep. 30, 2021

(51) Int. Cl.
*H04L 41/0631* (2022.01)
*G06F 16/248* (2019.01)
*G06F 16/2458* (2019.01)

(52) U.S. Cl.
CPC ........ *G06F 16/2477* (2019.01); *G06F 16/248* (2019.01); *H04L 41/064* (2013.01)

(58) Field of Classification Search
CPC ...... G06N 20/00; G06N 5/022; G06F 16/285; G06F 16/9024; G06F 16/156; G06F 16/2246; H04L 2463/121; H04L 41/145; H04L 41/22; H04L 43/08
See application file for complete search history.

(56) References Cited

U.S. PATENT DOCUMENTS 9,516,053 B1 * 12/2016 Muddu ................ G06F 16/254
707/999.003
2009/0198648 A1 * 8/2009 Middleton .......... G06F 16/2428
707/999.003
2021/0117857 A1 * 4/2021 Sriharsha ............... G06N 20/00
707/999.005

OTHER PUBLICATIONS

Philip Blackwood; "Scenarios for using historical inventory and topology"; https://wiki.onap.org/display/DW/Scenarios+for+using+historical+inventory+and+topology; Confluence; Jul. 2019; accessed Jul. 30, 2020; 27 pages.

* cited by examiner

*Primary Examiner* — Yuk Ting Choi
(74) *Attorney, Agent, or Firm* — Guntin & Gust, PLC; Jay H. Anderson

(57) ABSTRACT

An apparatus that stores historical data, wherein the historical data comprises a plurality of values for an attribute in which each of the plurality of values are associated with a respective information timestamp and historical timestamp. The system further filters the historical data based on a query, wherein the query is associated with one or more network elements and comprises a designated time. The system further derives values for the one or more network elements at a designated time based on the filtered historical data using at least the respective information timestamps and the historical timestamps. The system further includes based on the derived values, providing a query result, wherein the query result comprises a sequence of events associated with each of the plurality of values for the attribute.

20 Claims, 13 Drawing Sheets

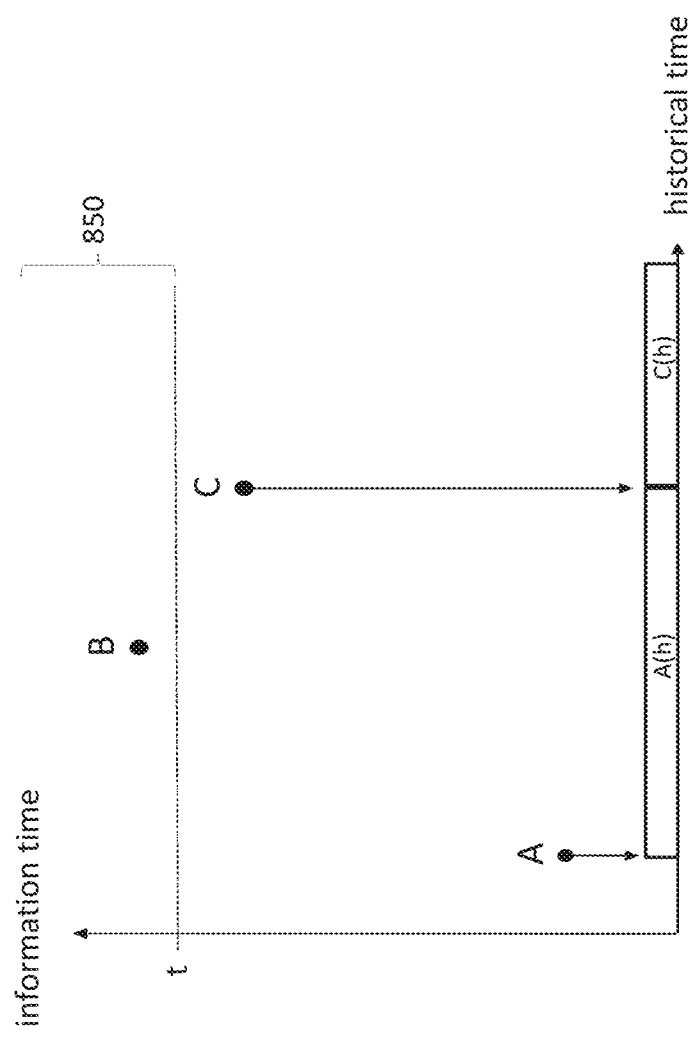

MANAGING TEMPORAL VIEWS OF DATA

TECHNICAL FIELD

The present disclosure relates generally to systems and methods for managing data and more particularly to systems and methods for managing data using temporal information.

BACKGROUND

When managing a network, it may be advantageous to query the inventory database to discover specific nodes, connectivity between nodes, hosting relationships between nodes, or induced pathways. However, managing and maintaining historical data related in the inventory database is complex and difficult to implement.

SUMMARY

Disclosed herein is an apparatus having a processor and a memory coupled with the processor. The processor effectuates operations including storing historical data, wherein the historical data comprises a plurality of values for an attribute in which each of the plurality of values are associated with a respective information timestamp and historical timestamp. The processor further effectuates operations including filtering the historical data based on a query, wherein the query is associated with one or more network elements and comprises a designated time. The processor further effectuates operations including deriving values for the one or more network elements at a designated time based on the filtered historical data using at least the respective information timestamps and the historical timestamps. The processor further effectuates operations including based on the derived values, providing a query result, wherein the query result comprises a sequence of events associated with each of the plurality of values for the attribute.

Disclosed herein is a computer-implemented method. The computer-implemented method includes storing, by a processor, historical data, wherein the historical data comprises a plurality of values for an attribute in which each of the plurality of values are associated with a respective information timestamp and historical timestamp. The computer-implemented method further includes filtering, by the processor, the historical data based on a query, wherein the query is associated with one or more network elements and comprises a designated time. The computer-implemented method further includes deriving, by the processor, values for the one or more network elements at a designated time based on the filtered historical data using at least the respective information timestamps and the historical timestamps. The computer-implemented method further includes based on the derived values, providing, by the processor, a query result, wherein the query result comprises a sequence of events associated with each of the plurality of values for the attribute.

Disclosed herein is a computer readable storage medium storing computer executable instructions that when executed by a computing device cause said computing device to effectuate operations including storing historical data, wherein the historical data comprises a plurality of values for an attribute in which each of the plurality of values are associated with a respective information timestamp and historical timestamp. The computer readable storage medium may further include filtering the historical data based on a query, wherein the query is associated with one or more network elements and comprises a designated time. The computer readable storage medium may further include deriving values for the one or more network elements at a designated time based on the filtered historical data using at least the respective information timestamps and the historical timestamps. The computer readable storage medium may further include based on the derived values, providing a query result, wherein the query result comprises a sequence of events associated with each of the plurality of values for the attribute.

BRIEF DESCRIPTION OF THE DRAWINGS

FIG. 9C is a diagram illustrating an exemplary data sequence according to one or more embodiments of the present disclosure;

DETAILED DESCRIPTION OF ILLUSTRATIVE EMBODIMENTS

Figure 1:
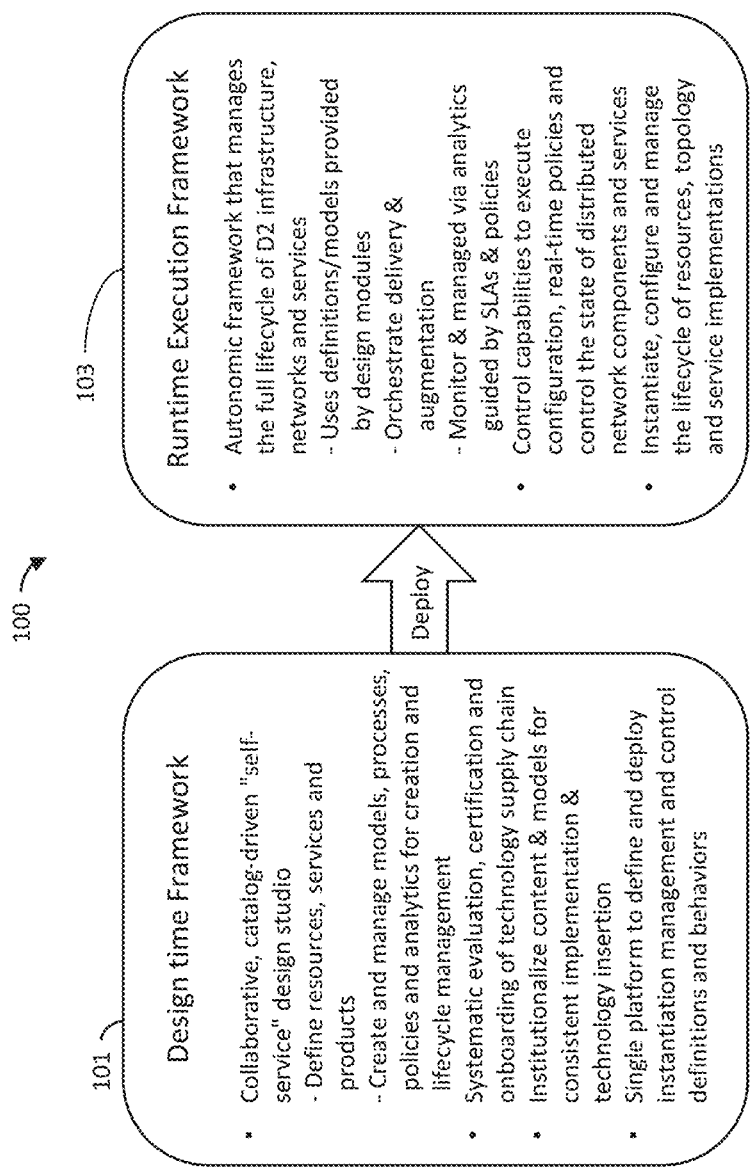
FIG. 1 is a block diagram illustrating the architecture of an enhanced control, orchestration, management, and policy platform according to one or more embodiments of the present disclosure.

Managing historical views of data in databases, e.g., relational or graph, and navigation thereof has proven to be a complex task. Conventional approaches often require complex reasoning or navigation. For example, in a conventional time tree approach, time itself is represented as a tree, and graph nodes are linked to the tree. If edges also have time associated with them, the edges need to be re-cast as nodes, which complicates reasoning about the graph. In a conventional simple node cloning approach, a graph node is cloned whenever any attribute (e.g., data defining a property of an object, element, or file; or a specific value for a given instance or setting thereof) is updated. When a node is cloned, edges associated with the node are also cloned, which leads to a proliferation of edges that makes navigation of the graph more complicated. In a conventional node cloning approach using an identity node, an identity node is created in the graph that contains attributes that do not change and also contains subtending nodes that contain attributes that do change. In the node cloning approach, the subtending nodes are cloned and results in a proliferation of edges and adds complexity to graph navigation. In a conventional versioning at the level of attributes approach, individual attributes have versions. When a data source indicates an attribute has a new value, the older value is not overwritten. In this approach, nodes and edges are not cloned. Accordingly, due to the complexity of the conventional approaches, when applying, for example, a time tree using the conventional approaches, computing resources would be strained thereby slowing a computing system. The temporal management views approach described herein may simplify the problem of storing and interpreting historical data and may be applied using any data storage that can store multiple values of an attribute, along with the two timestamps indicating when the value was true (according to a source of the data) and also when the value was updated in the data base. Accordingly, the described temporal management views approach may be used to determine a root cause or look for patterns in changes to a network that can be incorporated into the analytics of the monitoring environment and may be useful in reconstructing resources or services following a failure.

Because the conventional approaches may be difficult and complex, using these conventional approaches for learning, audit, troubleshooting, and quality assurance purposes when problems have been encountered (e.g., problems in the telecommunications network) is often too complex or cost prohibitive. Accordingly, implementing the temporal management views approach may allow for management of historical views of data in databases and navigation thereof in a less complex or cost prohibitive manner (e.g., by maintaining time information at the level of individual attributes). Disclosed herein is an approach to manage historical views of data and navigation thereof that maintains time information at the level of individual attributes. The temporal management views approach also employs a graphical representation using vertical and horizontal axes indicating two dimensions of time information to simplify understanding a problem (e.g. simplify an analysis needed to interpret the data).

Illustrated in FIG. 1 is a schematic of the architecture of an enhanced control, orchestration, management, and policy platform, (ECOMP platform 100) that is implemented in a cloud environment. The ECOMP platform 100 includes a design time framework component 101 and a runtime execution framework 103. The cloud environment provides a number of capabilities including real-time instantiation of virtual machines (VMs) on commercial hardware where appropriate; dynamic assignment of application and workloads to VMs; dynamic movement of applications and dependent functions to different VMs on servers within and across data centers in different geographies (within the limits of physical access tiedowns constraints); and dynamic control of resources made available to applications (CPU, memory, storage). With the use of network function virtualization, network appliances have been transformed into software applications. In the integrated cloud environment, the dynamic cloud capabilities are applied to applications—i.e., virtual network functions (VNFs)—thus applying the benefits of the cloud environment to virtual network elements. For example, VNFs, such as servers, virtual machines, storage, routers, switches, firewalls, can be "spun up" on commodity hardware, moved from one data center to another center dynamically (within the limits of physical access tie-down constraints) and resources such as CPU, memory and storage can be dynamically controlled.

The ECOMP platform 100 enables the rapid on-boarding of new services and the reduction of operating expenses and capital expenses through its metadata-driven service design and creation platform and its real-time operational management framework—a framework that provides real-time, policy driven automation of management functions. The metadata-driven service design and creation capabilities enable services to be defined with minimal information technology development required thus contributing to reductions in capital expenses. Real-time operational management framework provides significant automation of network management functions enabling the detection and correction of problems in an automated fashion contributing to reductions in operating expenses.

The ECOMP platform 100 enables product/service independent capabilities for design, creation, and lifecycle management. The design time framework component 101 is an integrated development environment with tools, techniques, and repositories for defining/describing network assets. The design time framework component 101 facilitates re-use models thus improving efficiency as more models are available for reuse. Assets include models of the cloud environment resources, services, and products. The models include various process specifications and policies (e.g., rule sets) for controlling behavior and process execution. Process specifications are used by the ECOMP platform 100 to automatically sequence the instantiation, delivery and lifecycle management aspects of the integrated cloud environment-based resources, services, products, and the components of the ECOMP platform 100. The design time framework component 101 supports the development of new capabilities, augmentation of existing capabilities and operational improvements throughout the lifecycle of a service. Service design and creation (SDC), policy, and data collection, analytics, and events (DCAE) software development kits (SDKs) allow operations/security, 3rd parties (e.g., vendors), and other experts to continually define/refine new collection, analytics, and policies (including recipes for corrective/remedial action) using a design framework portal. Certain process specifications (aka 'recipes') and policies are geographically distributed to many points of use to optimize performance and maximize autonomous behavior in integrated cloud environment's federated cloud environment.

The runtime execution framework 103 executes the rules and policies distributed by a design and creation environment. This allows for the distribution of policy enforcement and templates among various ECOMP modules (described below). These components advantageously use common services that support logging, access control, and data management.

Figure 2:
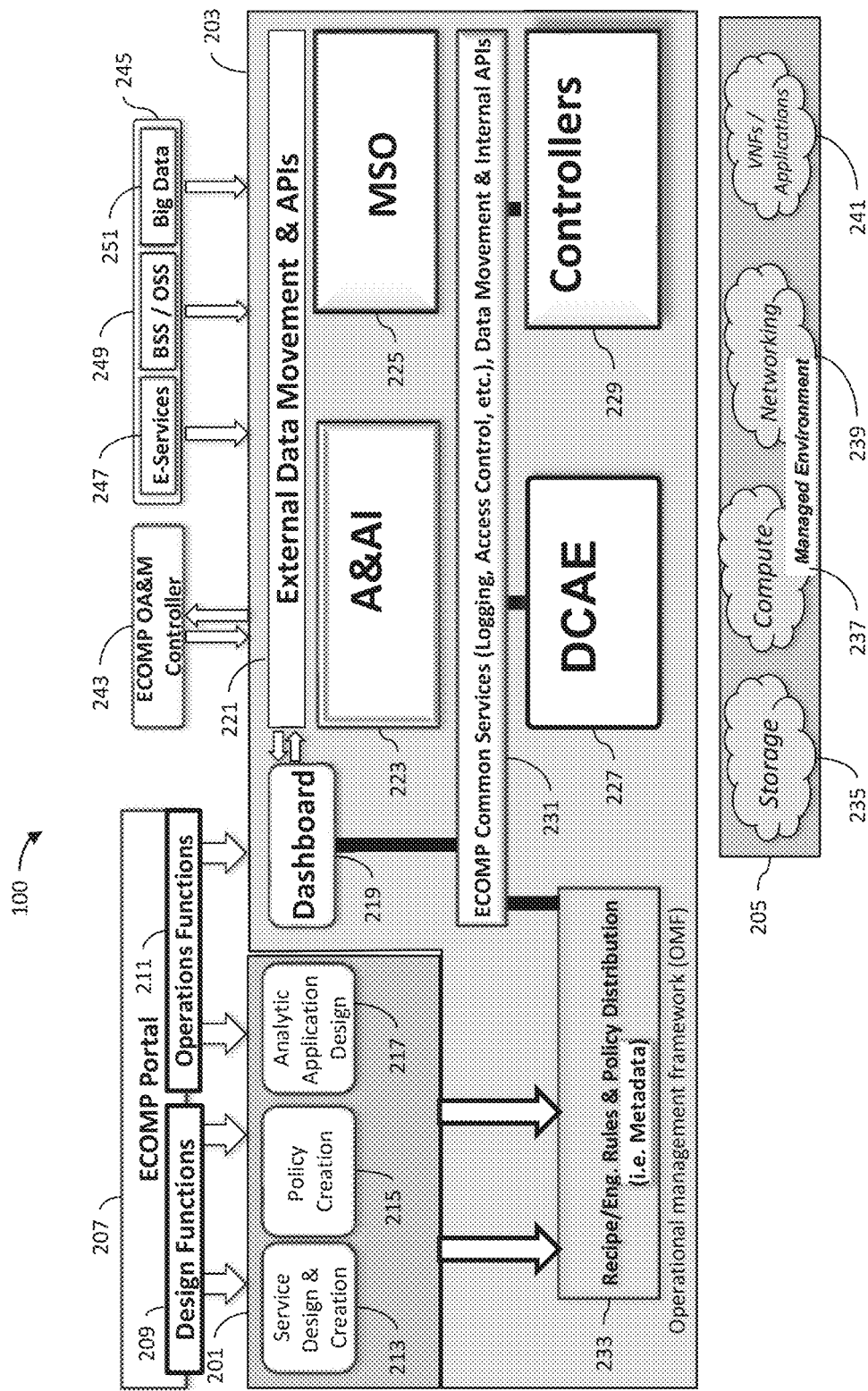
FIG. 2 is a block diagram of a platform for enhanced control, orchestration, management, and policy according to one or more embodiments of the present disclosure.

Illustrated in FIG. 2 are the components of an embodiment of the ECOMP platform 100. The ECOMP platform 100 is provided with three environments. These are the design creation environment 201, the execution environment 203, and the managed environment 205 shown as shaded areas in FIG. 2.

The ECOMP platform 100 includes an ECOMP Portal 207 that provides design functions 209 and operations functions 211. The design functions 209 include a service design and creation component 213 and policy creation component 215. The operations functions 211 include analytic application design component 217 and a dashboard 219. The service design and creation component 213, the policy creation component 215 and analytic application design component 217 are all part of the design creation environment 201. The dashboard is part of the execution environment 203.

In addition to the dashboard 219 the execution environment 203 includes: an external data movement and application program interface component, (API component 221); an active and available inventory module, (A&AI module 223); a master service orchestrator, (MSO 225); a data collection, analytics and events component, (DCAE module 227); controllers 229; a common services component 231; and a recipe/engineering rules and policy distribution component 233.

The managed environment 205 comprises resources, either hardware or software, that may be categorized as: infrastructure resources—(the Cloud resources, e.g., Storage 235, Compute 237); networking resources 239 (network connectivity functions & elements); and VNF/application resources 241 (the features and capabilities of a software application).

Interacting with the execution environment may be an operations, administration, and management controller, (OA&M Controller 243); and a number of external applications 245 that may include e-services 247, business support system and operational support systems, (BSS/OSS application 249), and big data services 251, among others.

Figure 3:
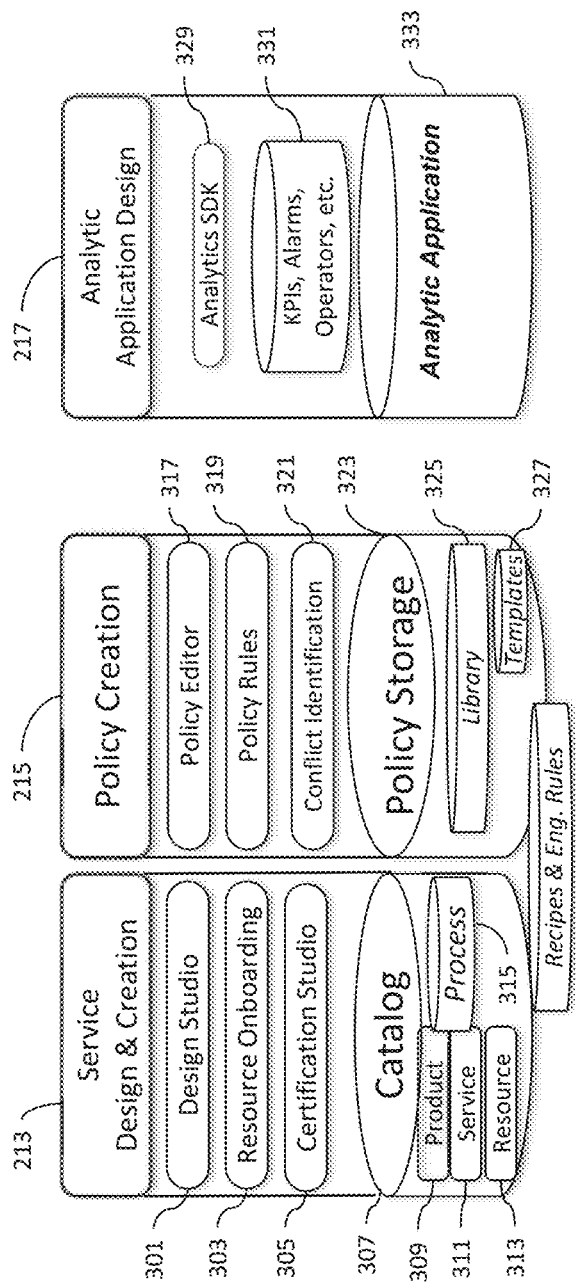
FIG. 3 is a block diagram of the service design and creation component, the policy creation component and the analytic application design component of the platform for enhanced control, orchestration, management, and policy according to one or more embodiments of the present disclosure.

Illustrated in FIG. 3 are the subcomponents of the service design and creation component 213. The service design and creation component 213 is an integrated development environment with tools, techniques, and repositories to define/simulate/certify cloud environment assets as well as their associated processes and policies. The service design and creation component 213 may include a design studio subcomponent 301; a resource onboarding subcomponent 303; a certification studio subcomponent 305; a catalog subcomponent 307. Catalog subcomponent 307 may include information about groups such as products 309, services 311, resources 313 and processes 315.

The policy creation component 215 deals with policies, which are conditions and requirements, constraints, attributes, or needs that must be provided, maintained, and/or enforced. At a lower level the policy creation component 215 involves machine-readable rules enabling actions to be taken based on triggers or requests. Policies often consider specific conditions in effect (both in terms of triggering specific policies when conditions are met, and in selecting specific outcomes of the evaluated policies appropriate to the conditions). Policies allow rapid updates through easily updating rules, thus updating technical behavior of components in which those policies are used, without requiring rewrites of their software code. Policies permit simpler management/control of complex mechanisms via abstraction. The policy creation component 215 may include a policy editor 317; policy rules subcomponent 319; conflict identification subcomponent 321; policy storage subcomponent 323. The policy storage subcomponent 323 may include a library 325 and templates 327.

The policy creation component 215 has a broad scope supporting infrastructure, product/services, operation automation, and security-related policy rules. These policy rules are defined by multiple stakeholders, (Network/Service Designers, Operations, Security, customers, etc.). In addition, input from various sources (service design and creation component 213, policy editor 317, customer input, etc.) are collected and rationalized. Therefore, a centralized policy creation environment will be used to validate policies rules, identify, and resolve overlaps and conflicts, and derive policies where needed. The policy creation component 215 is accessible, developed and managed as a common asset, and provides editing tools to allow users to easily create or change policy rules. Offline analysis of performance/fault/closed-loop action data are used to identify opportunities to discover new signatures and refine existing signatures and closed loop operations. Policy translation/derivation functionality is also included to derive lower level policies from higher level policies. Conflict detection and mitigation are used to detect and resolve policies that may potentially cause conflicts, prior to distribution. Once validated and free of conflicts, policies are placed in an appropriate repository.

After completing initial policy creation or modification to existing policies, the policy distribution component 233 sends policies (e.g., from the repository) to their points of use, in advance of when they are needed. This distribution is intelligent and precise, such that each distributed policy-enabled function automatically receives only the specific policies which match its needs and scope.

Notifications or events can be used to communicate links/URLs for policies to components needing policies, so that components can utilize those links to fetch particular policies or groups of policies as needed. Components in some cases may also publish events indicating they need new policies, eliciting a response with updated links/URLs. Also, in some cases policies can be given to components indicating they should subscribe to one or more policies, so that they receive updates to those policies automatically as they become available.

The analytic application design component 217 includes an analytics software development kit (SDK 329), and storage 331 for key performance indicators (KPIs), alarms, operators, etc., as well as storage for analytic application 333 (e.g., a Model-driven Rehoming Technique (MERIT) application).

Figure 4:
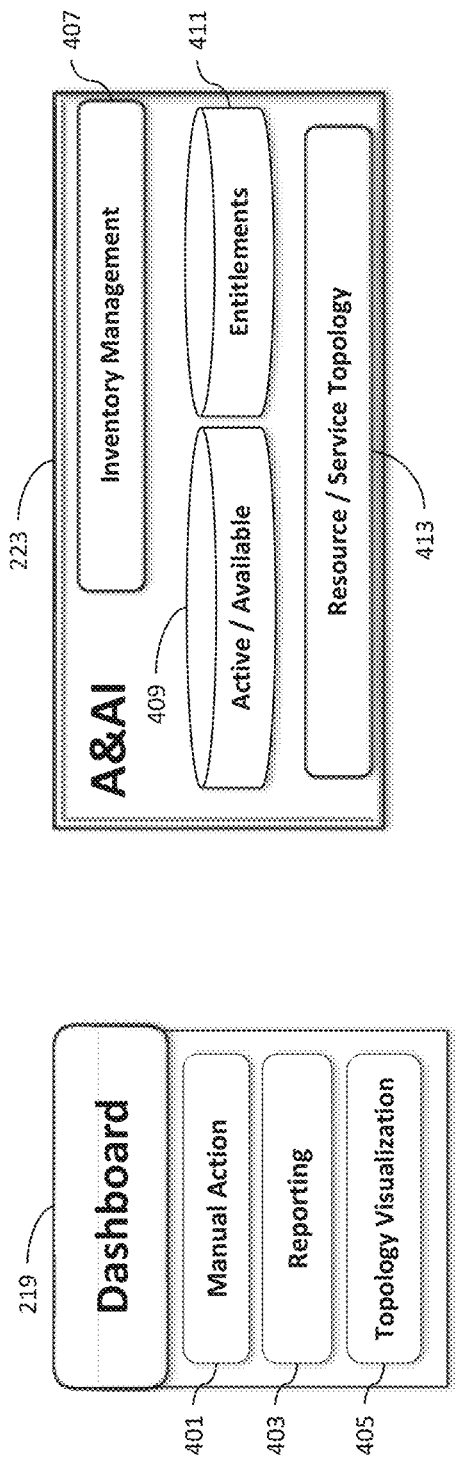
FIG. 4 is a block diagram of the dashboard and active and available inventory module of the platform for enhanced control, orchestration, management, and policy according to one or more embodiments of the present disclosure.

As shown in FIG. 4, the dashboard 219 includes a manual action subcomponent 401, a reporting subcomponent 403 and a topology visualization subcomponent 405. The dashboard 219 provides access to design, analytics, and operational control/administration functions.

The A&AI module 223 is the component that provides real-time views of the resources, services, products, and their relationships. The views provided by the A&AI module 223 relate data managed by multiple ECOMP platforms 100, business support systems and operation support systems, (BSS/OSS application 249), and network applications to form a "top to bottom" view ranging from the products customers buy to the resources that form the raw material for creating the products. A&AI module 223 not only forms a registry of products, services, and resources, it also maintains up-to-date views of the relationships between these inventory items. Active and available inventory submodule 409 will manage these multi-dimensional relationships in real-time. The A&AI module 223 is provided with an inventory management submodule 407, an entitlements submodule 411 and a resource/service topology submodule 413.

The inventory management submodule 407 maintains real-time inventory and topology data by being continually updated as changes are made within the integrated cloud. It uses graph data technology to store relationships between inventory items. Graph traversals can then be used to identify chains of dependencies between items. Data views of the A&AI module 223 are used by homing logic during real-time service delivery, root cause analysis of problems, impact analysis, capacity management, software license management and many other integrated cloud environment functions.

The graph may be defined with respect to a schema, which may be modeled as a graph whose nodes and edges may be instances of the node and edge classes of the schema, respectively. For example, $(C_V, C_E, H_V, H_E)$ may be a schema with a set $C_V$ of node classes, a set $C_E$ of edge classes, a node hierarchy $H_V$, and an edge hierarchy $H_E$. A network inventory over the schema may be a graph $G=(V, E)$, where V is a set of nodes and E, a subset of edges, is a subset of V×V.

The inventory and topology data includes resources, service, products, and customer subscriptions, along with topological relationships between them. Relationships captured by A&AI module 223 include "top to bottom" relationships such as those defined in the service design and creation component 213 and when products are composed of services, and services are composed of resources. It also includes "side to side" relationships such as end to end connectivity of virtualized functions to form service chains. A&AI module 223 also keeps track of the span of control of each controller and is queried by MSO 225 and placement functions to identify which controller to invoke to perform a given operation.

A&AI module 223 is metadata driven, allowing new inventory item types to be added dynamically and quickly via catalog definitions, reducing the need for lengthy development cycles. A&AI module 223 provides the following key requirements:

Provide accurate and timely views of resource, service, and product inventory and their relationship to the customer's subscription;

Deliver topologies and graphs;

Maintain relationships to other key entities (e.g., location) as well as non-integrated cloud environment inventory;

Maintain the state of active, available, and assigned inventory within the ECOMP platform 100;

Allow introduction of new types of Resources, Services, and Products without a software development cycle (i.e., be metadata driven);

Be easily accessible and consumable by internal and external clients;

Provide functional APIs that expose invariant services and models to clients;

Provide highly available and reliable functions and APIs capable of operating as generic cloud workloads that can be placed arbitrarily within the cloud infrastructure capable of supporting those workloads;

Scale incrementally as volumes in the ECOMP platform 100 and cloud infrastructure scales;

Perform to the requirements of clients, with quick response times and high throughput;

Enable vendor product and technology swap-outs over time, e.g., migration to a new technology for data storage or migration to a new vendor for MSO 225 or Controllers 229;

Enable dynamic placement functions to determine which workloads are assigned to specific components of the ECOMP platform 100 (i.e., Controllers 229 or VNFs) for optimal performance and utilization efficiency; and Identify the controllers 229 to be used for any particular request.

A&AI module 223 also performs a number of administrative functions. Given the model driven basis of the ECOMP platform 100, metadata models for the various catalog items are stored, updated, applied and versioned dynamically as needed without taking the system down for maintenance. Given the distributed nature of the A&AI module 223 as well as the relationships with other components of the ECOMP platform 100, audits are periodically run to assure that the A&AI module 223 is in sync with the inventory masters such as controllers 229 and MSO 225. Adapters allow the A&AI module 223 to interoperate with non-integrated cloud environment systems as well as 3rd party cloud providers via evolving cloud standards.

Consistent with other applications of the ECOMP platform 100, the A&AI module 223 produces canned and ad-hoc reports, integrates with the dashboard 219, publishes notifications other components of the ECOMP platform 100 can subscribe to, and performs logging consistent with configurable framework constraints.

Figure 5:
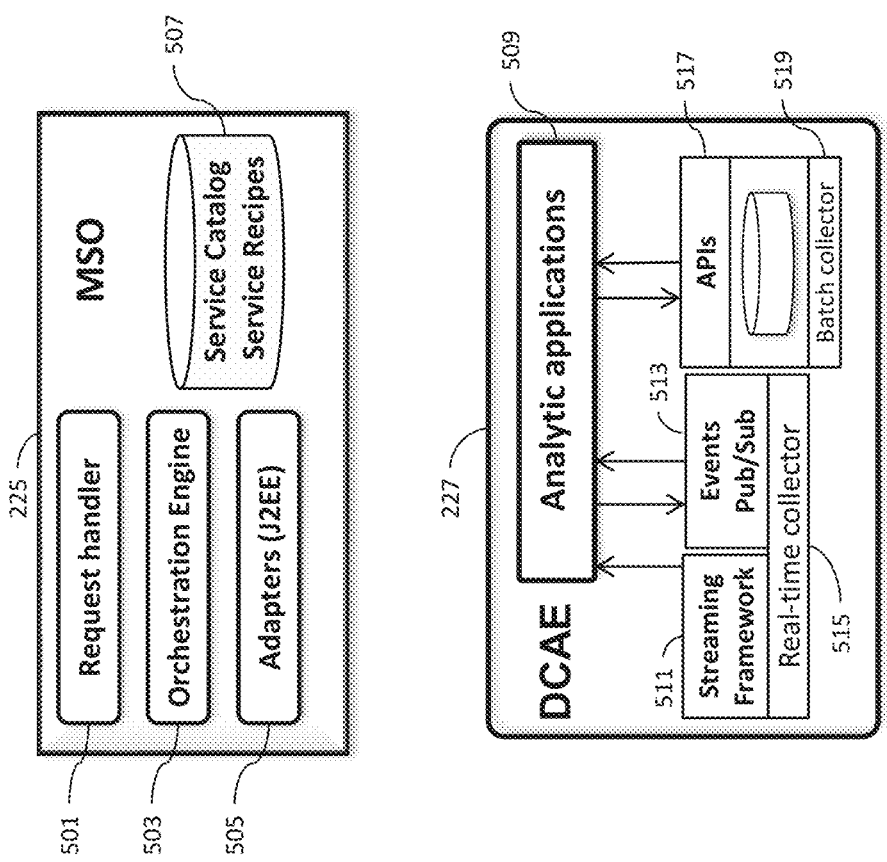
FIG. 5 is a block diagram of the master service orchestrator component and the data collection, analytics, and events component of the platform for enhanced control, orchestration, management, and policy according to one or more embodiments of the present disclosure.

The primary function of MSO 225 is the automation of end-to-end service instance provisioning activities. As shown in FIG. 5, MSO 225 includes a request handler 501, an orchestration engine 503, adapters 505, and service catalog service recipes 507. MSO provides an interface to orchestrate delivery of integrated cloud environment services. In general, orchestration can be viewed as the definition and execution of workflows or processes to manage the completion of a task. The ability to graphically design and modify a workflow process is the key differentiator between an orchestrated process and a standard compiled set of procedural code. Orchestration provides adaptability and improved time-to-market due to the ease of definition and change without the need for a development engagement. As such, it is a primary driver of flexibility in the architecture. Interoperating with policies, the combination provides a basis for the definition of a flexible process that can be guided by business and technical policies and driven by process designers.

Orchestration exists throughout the integrated cloud environment architecture and is not be limited to the constraints implied by the term "workflow" as it typically implies some degree of human intervention. Orchestration in integrated cloud environment will not involve human intervention/decision/guidance in the vast majority of cases. The human involvement in orchestration is typically performed up front in the design process although there may be processes that will require intervention or alternate action such as exception or fallout processing.

To support the large number of Orchestration requests, the orchestration engine 503 will be exposed as a reusable service. With this approach, any component of the architecture can execute process recipes. Orchestration services will be capable of consuming a process recipe and executing against it to completion. The Service model maintains consistency and reusability across all orchestration activities and ensures consistent methods, structure, and version of the workflow execution environment.

As shown in FIG. 5, DCAE module 227 includes an analytic applications module 509, streaming framework 511, an events pub/sub 513, real-time collectors 515, APIs 517 and batch collector 519. In the integrated cloud environment virtualized functions across various layers of functionality are expected to be instantiated in a significantly dynamic manner that requires the ability to provide real-time responses to actionable events from virtualized resources, applications, as well as requests from customers, carrier partners and other providers. In order to engineer, plan, bill and assure these dynamic services, DCAE module 227 within the framework of the ECOMP platform 100 gathers key performance, usage, telemetry, and events from the dynamic, multi-vendor virtualized infrastructure in order to compute various analytics and respond with appropriate actions based on any observed anomalies or significant events. These significant events include application events that lead to resource scaling, configuration changes, and other activities as well as faults and performance degradations requiring healing. The collected data and computed analytics are stored for persistence as well as use by other applications for business and operations (e.g., billing, ticketing). More importantly, the DCAE module 227 has to perform a lot of these functions in real-time.

DCAE module 227 provides real-time collectors 515 necessary to collect the instrumentation made available in the integrated cloud infrastructure. The scope of the data collection includes all of the physical and virtual elements (compute, storage, and network) in the integrated cloud infrastructure. The collection includes the types of events data necessary to monitor the health of the managed environment, the types of data to compute the key performance and capacity indicators necessary for elastic management of the resources, the types of granular data (e.g., flow, session & call records) needed for detecting network & service conditions, etc. The collection will support both real-time streaming as well as batch methods of data collection.

DCAE module 227 needs to support a variety of applications and use cases ranging from real-time applications that have stringent latency requirements to other analytic applications that have a need to process a range of unstructured and structured data. DCAE module 227 needs to support all of these needs and must do so in a way that allows for incorporating new storage technologies as they become available. This may be done by encapsulating data access via APIs and minimizing application knowledge of the specific technology implementations.

Given the scope of requirements around the volume, velocity, and variety of data that DCAE module 227 needs to support, the storage may use technologies that Big Data has to offer, such as support for NOSQL technologies, including in-memory repositories, and support for raw, structured, unstructured, and semi-structured data. While there may be detailed data retained at the edge layer of DCAE module 227 for detailed analysis and troubleshooting, applications may optimize the use of bandwidth and storage resources by ensuring they propagate only the required data (reduced, transformed, aggregated, etc.) for other analyses.

The DCAE module 227 includes an analytic framework which is an environment that allows for development of real-time applications (e.g., analytics, anomaly detection, capacity monitoring, congestion monitoring, alarm correlation etc.) as well as other non-real-time applications (e.g., analytics, forwarding synthesized or aggregated or transformed data to Big Data stores and applications); the intent is to structure the environment that allows for agile introduction of applications from various providers (Labs, IT, vendors, etc.). The framework supports the ability to process both a real-time stream of data as well as data collected via traditional batch methods. The analytic framework supports methods that allow developers to compose applications that process data from multiple streams and sources. Analytic applications are developed by various organizations; however, they all run in the DCAE module 227 and are managed by a DCAE controller (not shown). These applications are microservices developed by a broad community and adhere to the standards of the ECOMP platform 100.

The following list provides examples of types of applications that can be built on top of DCAE module 227 and that depend on the timely collection of detailed data and events by DCAE module 227. Analytics applications will be the most common applications that are processing the collected data and deriving interesting metrics or analytics for use by other applications or operations. These analytics range from very simple ones (from a single source of data) that compute usage, utilization, latency, etc. to very complex ones that detect specific conditions based on data collected from various sources. The analytics could be capacity indicators used to adjust resources or could be performance indicators pointing to anomalous conditions requiring response. The Fault/Event Correlation application is a key application that processes events and thresholds published by managed resources or other applications that detect specific conditions. Based on defined rules, policies, known signatures and other knowledge about the network or service behavior, this application would determine root cause for various conditions and notify interested applications and operations. A performance surveillance and visualization application provides a window to operations notifying them of network and service conditions. The notifications could include outages and impacted services or customers based on various dimensions of interest to Operations. They provide visual aids ranging from geographic dashboards to virtual information model browsers to detailed drilldown to specific service or customer impacts. The capacity planning application provides planners and engineers the ability to adjust forecasts based on observed demands as well as plan specific capacity augments at various levels, e.g., network functions virtualization infrastructure (NFVI) level (technical plant, racks, clusters, etc.), Network level (bandwidth, circuits, etc.), Service or Customer levels. A testing and troubleshooting application provides operations the tools to test and troubleshoot specific conditions. They could range from simple health checks for testing purposes, to complex service emulations orchestrated for troubleshooting purposes. In both cases, DCAE module 227 provides the ability to collect the results of health checks and tests that are conducted. These checks and tests could be done on an ongoing basis, scheduled or conducted on demand. Some components of integrated cloud environment may expose new targets for security threats. Orchestration and control, decoupled hardware and software, and commodity hardware may be more susceptible to attack than proprietary hardware. However, software defined networks (SDN) and virtual networks also offer an opportunity for collecting a rich set of data for security analytics applications to detect anomalies that signal a security threat, such as distributed denial of service (DDoS) attack, and automatically trigger mitigating action. The applications that are listed above are by no means exhaustive and the open architecture of DCAE module 227 will lend itself to integration of application capabilities over time from various sources and providers.

Figure 6:
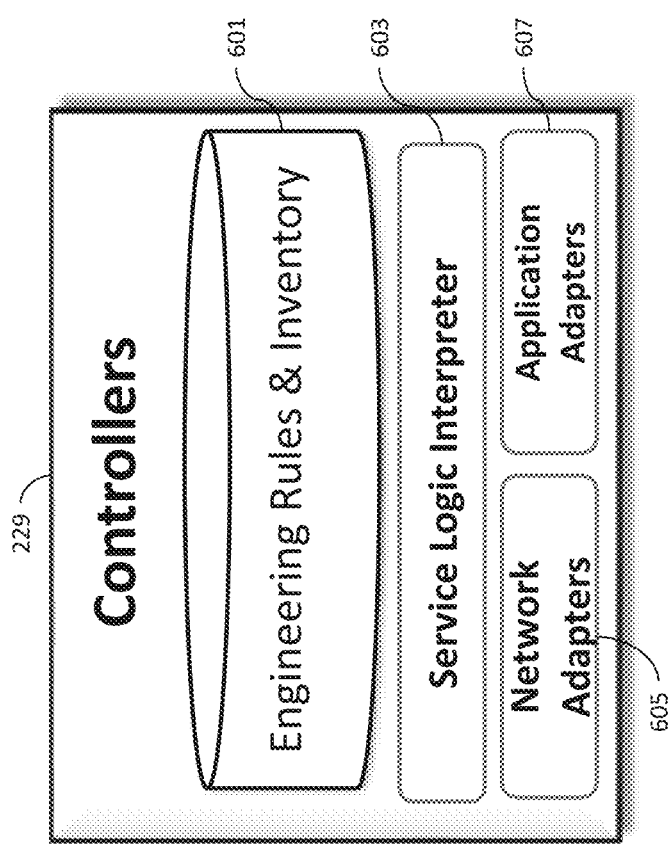
FIG. 6 is a block diagram of the components for the controllers of the platform for enhanced control, orchestration, management, and policy according to one or more embodiments of the present disclosure.

Illustrated in FIG. 6 are the components of the controllers 229. Controllers 229 include an engineering rules and inventories module 601, a service logic interpreter module 603; a network adapter module 605, and an application adapter module 607. Controllers are applications which are intimate with cloud and network services and execute the configuration, real-time policies, and control the state of distributed components and services.

Figure 7:
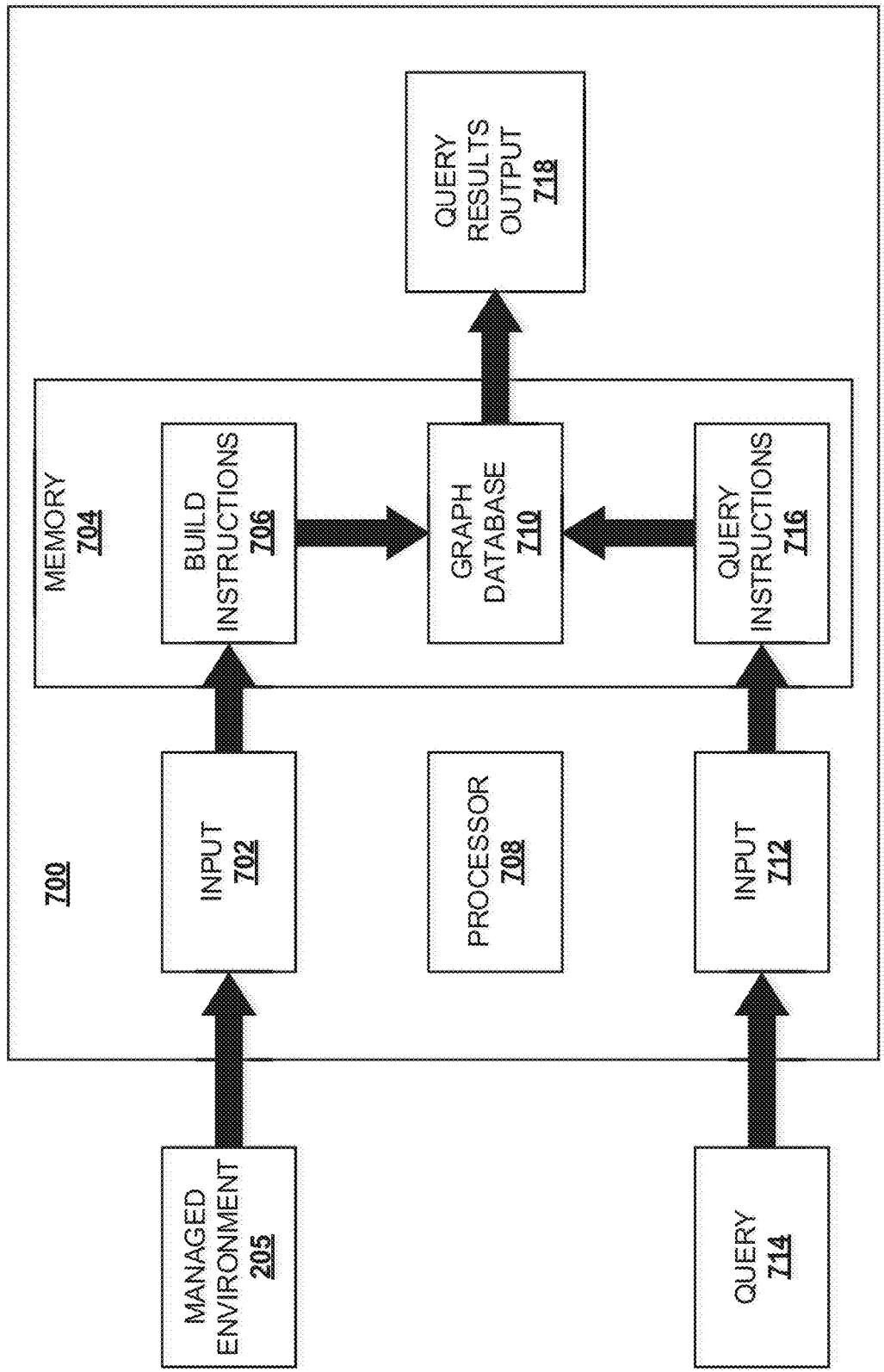
FIG. 7 is an exemplary data flow for system that may be used to create or query a graph database according to one or more embodiments of the present disclosure.

Illustrated in FIG. 7 is an exemplary data flow that may use system 700 to create a graph database or to query a graph database, which may reside in A&AI module 223 and utilize data from inventory management submodule 407. System 700 may include an input 702 that may be adapted to communicate with the managed environment 205 (e.g., a telecommunications network, network entities, networking resources, etc.) or receive information regarding the managed environment 205. System 700 may also include memory 704. Memory 704 may store build instructions 706 that may cause a processor 708 of system 700 to effectuate operations. These operations may be based on, use, or otherwise relate to data received at input 702 from the managed environment 205. Based on build instructions 706 or input 702, processor 708 may create a graph database 710. Further, system 700 may include an input 712 through which system 700 may receive a query 714. While input 712 is shown as separate from input 702, they may be implemented as a single input. Based on query instructions 716, processor 702 may apply query 714 to graph database 710. Querying a database 710 will produce a set of pathways, which may be outputted from system 700 by a query results output 718.

The data flow may include at least one of the following characteristics: data audits or data synchronization that can add or change data long after the fact, data that could be added from a new source (e.g. similar data bases are consolidated), for any other reason, data that sometimes arrives late or out of sequence. In light of the described characteristics, it may be beneficial to record when changes were made to the data, which may be accomplished by recording a timestamp indicating when the updates to the data were made. Accordingly, the recorded timestamp may be used to determine what data was used to reach a particular conclusion in the past, and determining what data was known and when the data was known.

Figure 8:
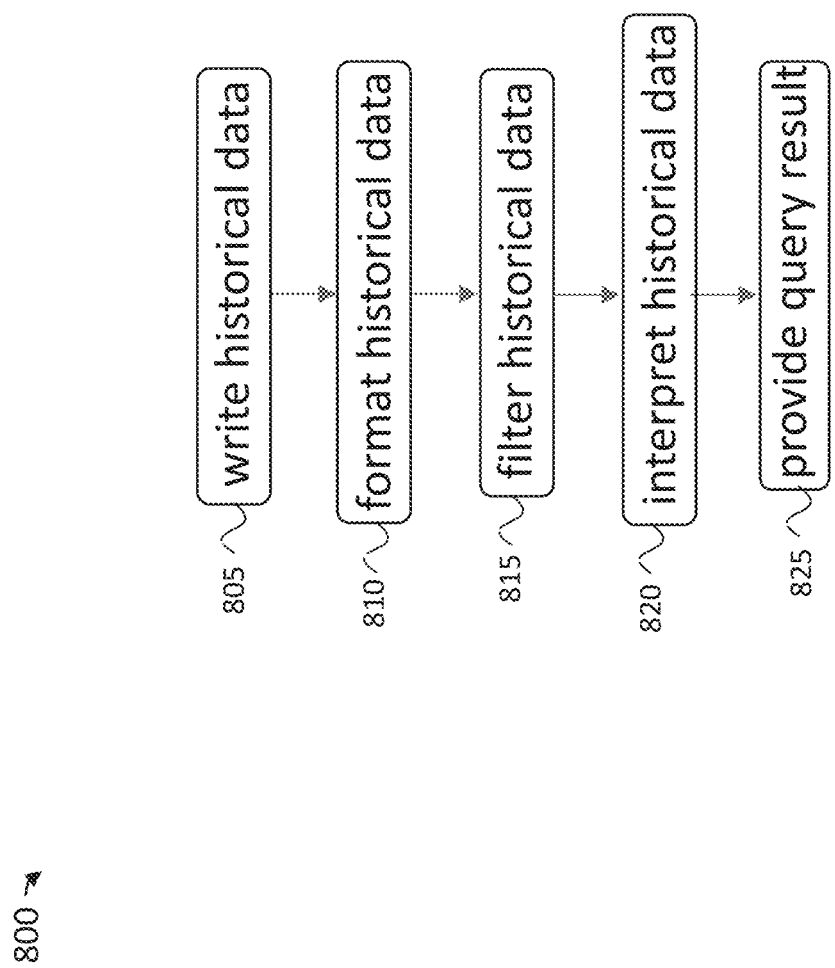
FIG. 8 is a flowchart of an exemplary method of operation in accordance with the present disclosure.

Illustrated in FIG. 8 is an exemplary operational flowchart in accordance with a method of managing historical data in the graph database (also referred herein as database) of FIG. 7. At block 805, historical data (e.g., stored inventory data, data related to a node, or relationships associated with the node) may be written into the database at an attribute level. For example, the processor 708 may receive and process one or more of the following attributes as shown in Table 1:

TABLE 1

| Attributes | Description |
| --- | --- |
| isObjectOrRelationship | (this may make the output easier to interpret) |
| ObjectOrRelationshipType | VNF, VM, VNF-to-VFC, etc. |
| ObjectOrRelationshipID | |
| attributeName | |

TABLE 1-continued

| Attributes | Description |
| --- | --- |
| valueStartTime | (the time at which the attribute took on its value) |
| attributeValue | |
| valueWriteTime | (the time at which the update was written to the data base) |
| valueSource | |
| valueUpdateReason | (e.g. to show that a value was updated during a data audit) |
| valueDeclaredIncorrect | (e.g., yes or no) |
| valueTimeDeclaredIncorrect | |
| valueNotNeededForQueriesTo | (this may contain a timestamp meaning the value is not needed for queries reaching back to the timestamped time) |

At block 810, the historical data may be formatted by writing time information associated with the historical data into the database at the attribute level. For example, timestamps and values may be stored. For example, the stored values may be related to an amount of memory available to a VNF, which may have many configurable parameters that could be changed over time. Parameters that may change over time may include flow control settings or an amount of storage capacity. When adding time information, instead of removing a node from the graph database, the node may be marked to indicate that the node no longer exists, while keeping any associated timestamps. For example, a new attribute "exists" may be added to the node, which can be set to "no" to indicate the node no longer exists. The same approach may be applied to edges.

Data may be formatted in a manner that causes values for a given attribute to be stored on consecutive lines of text and causes historical timestamps to be stored in reverse chronological order in order to simplify traversing the historical data. Markers may be placed in the text to distinguish values for each attribute. Storage of historical timestamps may, for example, be stored in the format as shown in Table 2:

TABLE 2

| attribute separator (Marker) |
| --- |
| Object\|VNF\|id21776\|flavor\|year-month-day time\| |
| Object\|VNF\|id21776\|flavo\|year-month-day time\| |
| Object\|VNF\|id21776\|flavor\|year-month-day time\| |
| attribute separator (Marker) |

At block 815, historical data may be filtered by the processor to obtain data of interest using, for example, a query. Method 800 may employ a time-filter to obtain historical data from time T1 to time T2, based on data available at time t. The time filter may filter data according to timestamps which may be reviewed and utilized by a user or application to draw inferences about the sequence of events that have occurred. For example, the time filter used to report a data history between times T1 and T2 based on data available at time t may employ the following format:

```
# time-filter

# this script is part of a sequence to show historical data between times T1 and T2
based
on data available at time t

# performance may be improved by using nawk to compile the awk scripts -closure
scripts may be used instead of awk scripts

# constraints: earliestViewableTime <= T1 <= T2 <= t

# the input format has been selected for ease of processing
```

```
# the input format has:
#   all values for an attribute on consecutive lines of input
#   values sorted in reverse order of historical time to allow stepping back in time
#   separators between attributes

# the input format is generated by a separate script, time-formatter

# the time-filter is applicable for data in which an attribute represents a state
#   e.g. if a value in the real world is "x" it remains "x" until changed
#   so the value of an attribute at T1 is the latest value that was set prior to T1
#   this is the rationale for the attribute name "valueStartTime"

# output can be fed into an interpreter (e.g. it would derive the value at T1)

cat formattedData |
awk '
BEGIN {
T1 = "2016-01-01"
T2 = "2019-10-01"
FS = "|"
}
# read one line of data and process it
{
# initialize for each new attribute
if ($0 ~ "attribute separator") {
    foundFirst = "no"
    print
    next
    }
  valueStartTime = $5
# stepping back in historical time for one value:
#   keep if historical time is not known
#   toss if historical time is greater than T2 #   for the remaining values:
#     keep if the historical time greater than T1
#     keep only the first value with start time less than or equal to T1
  if (valueStartTime == "") {
    print
    next
    }
  if (valueStartTime > T2) next   # could be moved to pre-filter in Appendix C
  if (valueStartTime > T1) print
  if (valueStartTime <= T1 && foundFirst == "no") 1
    print
    foundFirst = "yes"
    }
} '
```

Method 800 may also employ an age-filter to identify data that is not vital for displaying historical data back to a fixed time (e.g., T1). For example, the age filter used to identify values not needed for queries back to a time T1 (or later) and may employ the following format:

```
# age-filter

# this script is part of a sequence of steps to manage historical data
# it identifies records that are not needed to perform queries back to historical time T1

# performance may be improved by using nawk to compile the awk scripts

# age-filter uses the same input format of data as time-filter, as created by time-formatter
# when used to prepare data for age-filter, t can be set to T1

# recommended use of age-filter to speed up scripts # concept: marking values that are not needed for certain queries can be used to
# pre-filter out unneeded data and speed up the sort step of the time-formatter
#   on a daily or weekly basis, run age-filter with the current date
#   pre-filter out values that already have a value in valueNotNeededForQueriesTo
#     (reason: if not needed for older queries, certainly not needed for more recent queries)
#   this will identify records not needed to perform queries back to the beginning of the day
#   for each value that is not needed, store the date in valueNotNeededForQueriesTo
#   as time goes by, these dates become farther in the past
```

```
#   queries that go back to any time T1 can pre-filter out the values with notNeeded <
T1
#   to archive and remove older records, simply find records not needed prior to a
fixed
date
#        when older data is removed, set the value of a parameter
earliestViewableTime
#           earliestViewableTime should then be enforced in all historical
queries #

# note: it does not help to mark records needed because new records are constantly
being
created

# the filter is applicable for data in which an attribute represents a state
#   e.g. if value in the real world is "x" it remains "x" until changed
#   so the value of an attribute at T1 is the latest value set prior to T1

cat formattedData |
awk '
    BEGIN {
        T1 = "2018-01-01"
        FS = "|"
    }
# read one line of data and decide if it should marked as not needed
{
# initialize for each new attribute
    if ($0 ~ "attribute separator") {
        foundFirst = "no"
        print
        next
    }
    isObjectOrRelationship    = $1
    objectOrRelationshipType  = $2
    objectOrRelationshipID    = $3
    attributeName             = $4
    valueStartTime            = $5
    attributeValue            = $6
    valueWriteTime            = $7
# true statements about data needed for queries back to time T1
#   needed if historical time is not known
#   needed if write time is greater than or equal to T1
#   needed if historical time is greater than or equal to T1
#   all of the values not needed have both historical and write time less than T1
#     the historically latest value with historical time less than T1 is needed
#     values with earlier historical time are notneeded
#     object or relationship is notneeded if historical end of existence is prior to T1

# since we only mark the "not needed" the following logic is sufficient
# update to set value of notNeededForQueriesTo instead of printing text

    if (valueStartTime < T1 && valueWriteTime < T1) {
        if (attributeName == "exists" && attributeValue == "no") {
            lineToPrint = (isObjectOrRelationship "|" objectOrRelationshipType "|"
objectOrRelationshipID "|remove entire" isObjectOrRelationship)
            print lineToPrint
        }
        if (foundFirst == "no") {
            foundFirst = "yes"
            next
        }
        else {
            lineWithResult = ($0 "|not needed for queries back to " T1)
            print lineWithResult
        }
    }
} '
```

Accordingly, method 800 may filter data in consideration of two aspects of time: a historical time and an information time. The information time may be a time (e.g., a timestamp) in which information was recorded. A data source (e.g., node, VNF, etc.) may provide the historical time (e.g., a timestamp), which may be utilized to indicate when a value became true. If a data value is unknown, the data source may provide an indication of when the value became unknown. The data source may also provide an indication of whether the data source is providing the data after-the-fact (e.g., during data synchronization). Coordination between data sources providing timestamps may be utilized by having each data source send timestamps based on a common or similar clock (e.g., all data sources providing timestamps based on Coordinated Universal Time (UTC) and synchronizing all data source clocks to a common reference via Network Time Protocol (NTP).

Figure 9A:
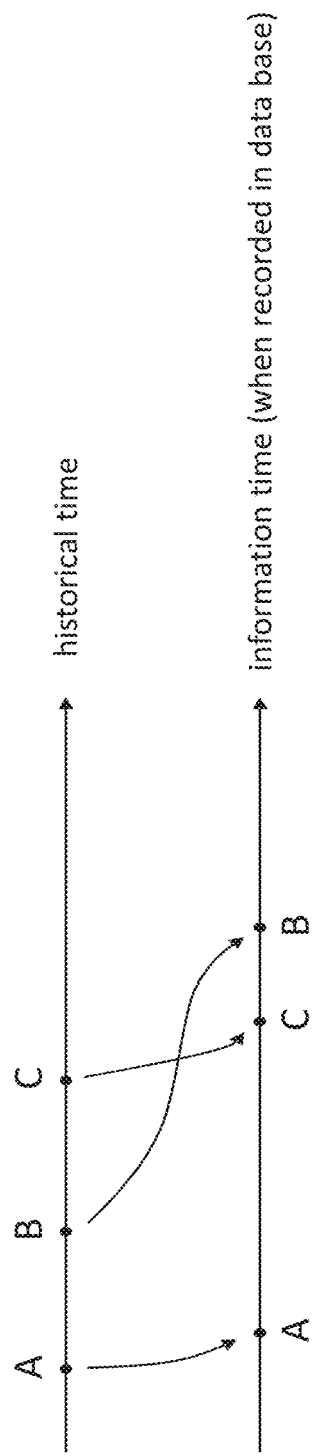
FIG. 9A is a diagram illustrating an exemplary data sequence according to one or more embodiments of the present disclosure.

Because method 800 employs two dimensions of time, method 800 may account for data that arrives out of sequence. As illustrated in FIG. 9A, data that arrives later than anticipated or otherwise out of sequence for an attribute having several associated values (A, B, and C), which may be viewed and filtered according to an associated historical time and information time. Method 800 may store values A, B, and C, as well as associated historical time and information time for each value. Without storing the historical time and information time for each value, data considerations may only be based on when a value was recorded into the database, which would result in a problem (e.g., an incorrect value B being returned in a query due to value C being recorded prior to recording value B, which overwrites value C because value B arrived later than value C). To address timing and overwrite problems, method 800 may record the three values A, B, and C along with their associated timestamps without overwriting any existing data for the attribute.

At block 820, the processor may interpret the filtered historical data to derive values for attributes at a designated time (e.g., T1). Because query and filtering of method 800 may be used to narrow the data presented, the filtered data may be used, for example, to identify larger-than-expected gaps between the two timestamps, which may indicate that the data was received late. The processor may further interpret this instance as data that was missing during an interval between the timestamps and may identify decisions made during the interval between the timestamps using the data available during the interval. The processor may then revisit the decision for accuracy purposes. Another interpretation may involve reviewing the data for frequency of changes in a value. This could indicate that automated recovery mechanisms are "flapping" (e.g., memory constantly being scaled up and down more frequently than best practices indicate). Another interpretation may involve reviewing frequency of late-arriving data occurring, which may be an indication of problems in the flow of data from a source to the database, such as the network to the database.

The interpreter may employ the following exemplary format to derive values for attributes:

```
#   time-formatter

#   input may use one line of text per attribute value
#   the output is grouped by object/attribute/historical time
#   the output is in a format used by time-filter and age-filter

#   performance budget is dominated by a UNIX sort command
#   there is some pre-filtering prior to the sort step
#   performance can be improved by moving some conditions in
#   the time-filter and age-filter to the pre-filter
#   conditions that do not rely on the grouping by value or sorting by dates
#   could be moved to the pre-filter

#   takes optional parameter t
#   when t is provided, the output includes only values written before time t
#   the value of t should be greater than earliestViewableTime

# the input format has been selected to make processing simple
# the input format has one line of data for each value of an attribute, e.g.
#       isObjectOrRelationship     = $1
#       objectOrRelationshipType   = $2
#       objectOrRelationshipID     = $3
#       attributeName              = $4
#       valueStartTime             = $5
#       attributeValue             = $6
#       valueWriteTime             = $7
#       valueSource               =$8
#       valueUpdateReason          = $9
#       valueDeclaredIncorrect     = $10
#       valueTimeDeclaredIncorrect     = $11
#       valueNotNeededForQueriesTo = $12

#   the positioning of the first 5 attributes has been chosen so a UNIX sort command
#   will result in all values for a given attribute to be on consecutive lines in historical
order

#   some of the attributes are included for use in an interpreter that would follow the filter
#   only a few of the attributes are actually used by the formatter or the filters

#   pre-filtering steps
#       data not needed for any query going back to time T1
#       data not needed for any query based on data available as of time t

#   steps of the time-formatter to organize the data for the time-filter and age-filter:
#       sort in reverse order. Because of the input format,
#           this puts all the values for an attribute on consecutive lines
#           if also puts the values in reverse historical order
#       insert separators between attributes

# -------------------------------------------------------------------------------------------
cat dataSample1 |
# -------------------------------------------------------------------------------------------
#   pre-filter to reduce the amount of data that needs to be sorted
```

```
# filter out values not needed for a query that goes back to time T1
# filter out values not needed for a query based on data available at time t
# other criteria could be added - anything that makes sense prior to sorting
# for prototype, value of t is embedded in script
awk '
   BEGIN {
      t = "2019-05"
      T1 = "2018-01-01"
      FS = "|"
      }
# read a line of data and decide what to keep
   {
   valueWriteTime = $7
   valueNotNeededForQueriesTo = $12
   if (valueNotNeedeForQueriesTo < T1) next
   if (valueWriteTime <= t) print
   } ' |
# -------------------------------------------------------------------------------------------
# sort in reverse order of historical time
sort -r |
# all values for a given attribute are now on consecutive lines of text
# -------------------------------------------------------------------------------------------
# insert separators between attributes
# for each line of data, the processing pattern is:
#    read the line
#    compare the line to the previous line to see if the attribute is the same or different
#    if the attribute has changed from the previous line, print the previous line and print
the separator
#    save the current line for comparison when the next line is read

# on the first line of input, there is no previous line to print
# on the last line of input, just print it with the marker "last line of attribute"

awk '
   BEGIN {
      FS = "|"
      previousLine = ""
      previousUniqueAttributeID = ""
      }
# read a line of data and process it
{
   objectOrRelationshipID = $3
   attributeName =          $4
   # concatenate to get a unique ID for the attribute (e.g. unique across objects)
         uniqueAttributeID = (objectOrRelationshipID "|" attributeName)
   # initialize with first line of data
         if(FNR == 1) {
            print "attribute separator"
            previousLine = $0
            previousUniqueAttributeID = uniqueAttributeID
            next
            }
   #   steps below are for lines after the first line
   #      if the attribute has changed, print the previous line and the separator
   #      if the attribute has not changed, just print previous line
         if (uniqueAttributeID != previousUniqueAttributeID)   {
                print previousLine
                print "attribute separator"
                }
         else print previousLine
   # remember information from this line to use when processing next line
         previousLine = $0
         previousUniqueAttributeID = uniqueAttributeID
}
# end of processing one line
# after the last line has been processed
END {
     print previousLine
     print "attribute separator"
     }
'
# end of time-formatter
# -------------------------------------------------------------------------------------------
```

Figure 9B:
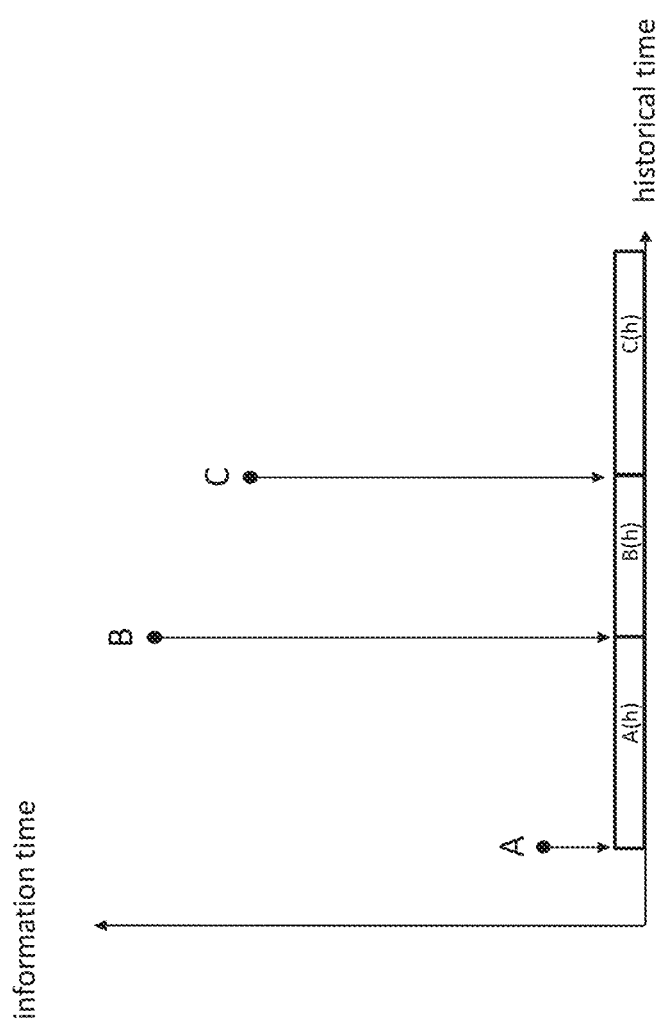
FIG. 9B is a diagram illustrating an exemplary data sequence according to one or more embodiments of the present disclosure.

At block 825, the processor may provide a query result (e.g., a historical view of data based on a latest available data). The historical view of data provided may include values in effect at a given time together with indicators of timeliness of the data. The historical view may be viewed by a user (e.g., via a display) or utilized by an application to draw inferences about the sequence of events that have occurred. The inferences may be used by the user or application for learning, audit, troubleshooting, and quality assurance purposes. The historical view may be in consideration of a specific time or range of time. FIG. 9B illustrates an exemplary data sequence according to an exemplary embodiment of the present disclosure. The view may indicate several values (A, B, and C, which are associated with historical times A(h), B(h) and C(h), respectively)) that are associated with an attribute, which may be charted on a graph where a first axis represents "information time" and a second axis that represents a "historical time". The exemplary view indicates historical time stored with each value A, B, and C, which may be based on a timestamp and utilized to indicate when a value became true. Accordingly, based on the exemplary view, when considering a historical time, value A preceded value B both of which proceeded value C. The exemplary view also indicates an information time stored with each value A, B, and C, which may be utilized to indicate when each value was written to the database. Accordingly, based on the exemplary view, when considering an associated information time, value A preceded value C both of which proceeded value B. By considering both a historical time and information time for each value, troubleshooting to identify and remediate problems in data flows may be conducted more accurately because the system has insight into what data has arrived from a data source, when the data values have become true, or when the data values were written to the database. Moreover, the ability to see what data was available at a time in the past may be used to determine whether all of the data needed to make a valid decision was available at the time a decision using the data was made. Furthermore, the ability to see what data was available at a time in the past may be used to tune a decision-making criteria by considering various what-if decision criteria scenarios. By adjusting the decision-making criteria, the system may determine how a proposed decision-making criteria would have worked using data from the past.

FIG. 9C illustrates an exemplary data sequence according to an exemplary embodiment of the present disclosure. The view may indicate several values (A, B, and C) that are associated with an attribute, which may be charted on a graph where a first axis represents "information time" and a second axis that represents a "historical time". The historical view may be based on data that was available at a given time (e.g., time t). For example, value B may not be known for a time period 850.

An 'exist' attribute, which may be associated with a given node and may be utilized to record the timestamps of when a value or relationship came into existence or no longer exist. The 'exist' attribute may also add a time dimension to the node. Accordingly, instead of removing the node in response to receiving information indicating an item represented by the node no longer exists, the graph database 710 may mark the node as no longer existing by setting the 'exist' attribute to "no" while retaining any timestamps associated with the node. The same approach may be applied to edges associated with the graph database 710.

In instances when data stored in the graph database 710 is later found to be incorrect (e.g., data is no longer valid), the graph database 710 may address the incorrect data by utilizing a 'time-declared-not-valid' timestamp. The 'time-declared-not-valid' timestamp may be used to mark a record as incorrect, and well as capture a time at which a conclusion that the data was incorrect was recorded. Accordingly, queries based on data available after a time associated with the 'time-declared-not-valid' timestamp may not show the value, while queries based on data prior to this time may show the value. Hence, the graph database 710 may provide a complete trail of the history of an attribute without overwriting any of the history.

Figure 9D:
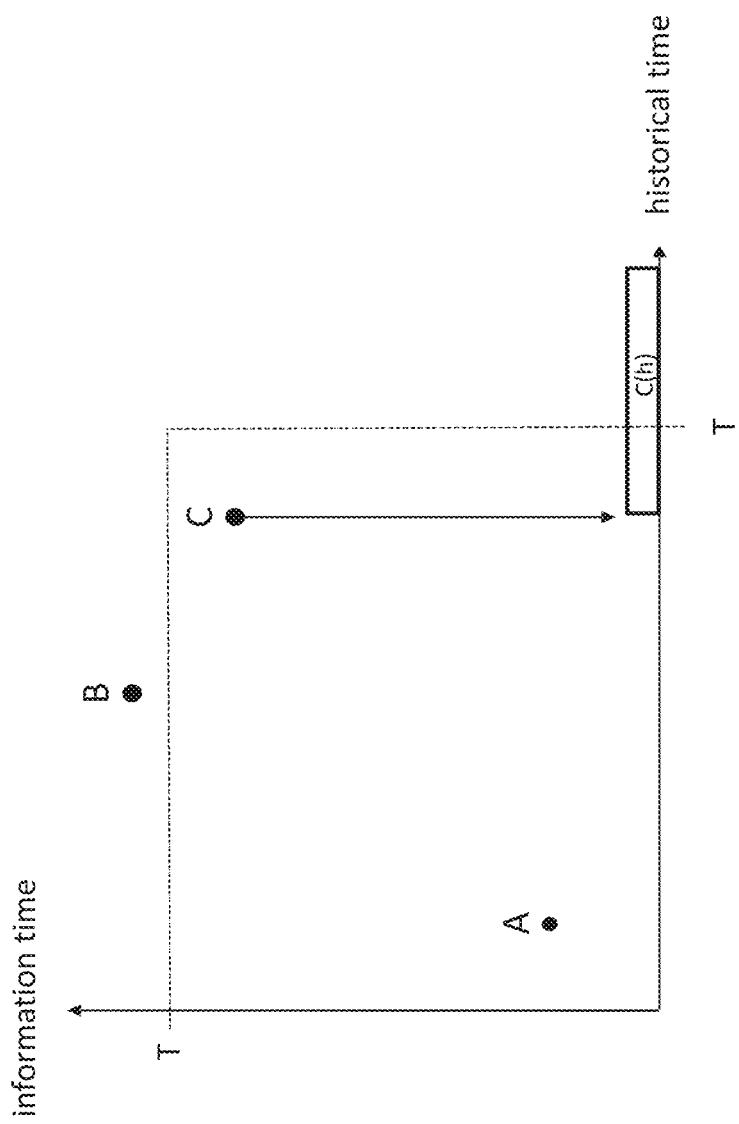
FIG. 9D is a diagram illustrating an exemplary data sequence according to one or more embodiments of the present disclosure.

There may be instances in which older records may be removed from graph database 710 in order to prevent data from being retained longer than necessary. Older records may be removed in a manner to make sure that the historical views do not result in jagged edges. Jagged edges are gaps in the data available to view a state of the network at a given time, based on data available at a given time. An earliest-viewable-time may be associated with each record. The method 800 may additionally identify records that are not needed because the records have an earliest-viewable-time prior to a time T associated with a query. The historical view may be viewed by a user (e.g., via a display) or utilized by an application based on data available from time T. FIG. 9D illustrates an exemplary data sequence according to an exemplary embodiment of the present disclosure. In the historical view, candidates for removal are located within a box bounded by time T on each axis. A value C may be retained because it is the value at time T. A value A may be removed because it will not be part of any view constrained to a historical time after T based on data available at time T or later.

When writing to the graph database 710 to set an attribute value (e.g., value A), a value-start-time and a value-written-time may set and associated with the attribute (see Table 1). The value-start-time may be a timestamp provided by a source indicating a time at which the attribute assumed the value A. The value-written-time may be a time the value is written to the graph database 710 (e.g., attribute xyz took on value A at time t).

When reading from the graph database 710 in response to a query, time data (e.g., T1 and T2) should be consistent and be viewed in light of one or more constraints (e.g., when viewing a history between times T1 and T2 based on data available at time t.) The following constraints may be utilized—earliest-viewable-time ←T1←T2←t. To return a value of an attribute at a time T, based on data available at time t, which may be a current time, the processor 708 may determine a value that meets the one or more of the following criteria: 1) an entity or relationship existed at that time, 2) a value-write-time is less than or equal to t, 3) a time-declared-not-valid is null or greater than t and of all the remaining candidate values, or 4) selecting the candidate value having the latest value-start-time less than or equal to T. To return the sequence of values for an attribute between the time period T1-T2, based on data available at time t, which may be a current time, an initial value at time T1 may be determined and subsequently read off a sequence of additional values meeting one or more of the following criteria: an entity or relationship existed at that time, a value-write-time is less than or equal to t, a time-declared-not-valid is null or greater than t, or the value-start-time less than or equal to T2.

Accordingly, the present disclosure provides a system (e.g., system 700) that manages historical views of data in databases and navigation thereof that maintains time information at the level of individual attributes. As compared to conventional approaches, such as a time tree or cloning of nodes and edges, storing multiple versions of individual attributes, as described herein, may provide simplified graph navigation and may utilize a smaller volume of data. The graphical representation of a historical view using vertical and horizontal axes for the two dimensions of time may allow for analysis and decisions about the data to occur in a simpler manner. Writes to an associated graph database may be simplified by writing the data provided, without having to check for sequencing and without making inferences that may later be negated as new updates are recorded. Accordingly, the system described herein may handle instances in which data is received out of sequence by utilizing timestamps. Storing the historical timestamps may allow the system to draw inferences about a sequence of events and storing the time at which data is written provides an additional layer of information that may provide insight into data and values thereof at a given point in time.

The system recognizes that query types may be utilized to tune performance of the system. For example, some applications may be more interested in bulk queries and counts (e.g. how many of xyz did we have at a given time) while others may be more interested in graph navigation, typically starting at a given node of the graph. Graph navigation may be logically separated from attribute handling, and this fact might be used to tune performance. For example, if history data has been retained for the past 6 months, but most queries go back no further than 24 hours, the system may mark records as follows: once a day, retrieve all unmarked records and find those which are no longer needed for the current view of history. The system may then mark the data by setting the value of a new attribute, value-not-needed-for-queries-to =T. Having marked the data in this way, when obtaining a historical view back to a time T1, values with value-not-needed-for-queries-to <T1 may be ignored.

The system also addresses backward compatibility. For example, historical views and current views may be read from a same graph database. In a graph database without time dimensions, rules about backward compatibility of views occurring after a change to the graph schema may be employed. The introduction of a time dimension offers the possibility of employing additional rules, such as a requirement that older data should be presented in the same format defined at the time the data was written. Another approach is to allow the older data to be presented using a newer schema(s).

In another example, historical views are held in a graph database separate from a graph database used for current views. In this case, an option of using a new version of the schema on a going-forward basis only or never migrating existing data to the new schema may be selected. Accordingly, managing the historical data and interpreting views may simpler if the schema of the historical graph database is migrated along with the schema of current-view graph database.

The system described herein may be utilized in the telecommunication industry, where inventory data may record facts about network elements and topology data may record relationships between elements in the network, including connections. The system may store a history at a level of individual attributes, introduce a diagramming convention that simplifies reasoning about how to read, write, and interpret the historical data, prevent an overwrite of existing data, account for data that arrives late or out of sequence, identify records that may be removed because the records no longer needed, manage "corrections" to the data, determine if decisions made using the historical data should be revisited based on receipt of more recent data, or determine how to manage schema changes.

When problems occur in a network, historical data may be used to ensure that correct actions were taken to understand the problems and provide associated details, which may be used to establish preventive measures or design analytics that can automatically recognize the problem in the future. When there is a problem in the network, analysis may continue for a period of time or events may be reconstructed. For example, operations may be investigating a problem and suspect that the problem may have started two days ago. The historical views of data described here may allow users to see a state of the network at the time of the event (e.g., two days ago) including attributes and relationships.

Also, once a problem has been detected in the network, operations may want to determine what changes were made in the network just prior to the time of the problem.

Historical inventory data may also be combined with non-inventory data including events in the network, or VNF syslogs or application logs. Combining the history from these sources may be used to test a new analytic against a set of known problems that may have occurred. When a new type of problem is found in the network, the data may be used to confirm hypotheses about the root cause or look for patterns that can be incorporated into the analytics of the monitoring environment.

The historical inventory described herein may be useful in reconstructing resources or services following a major failure. The historical data may include views of the inventory based on the inventory data available at a specific time. For example, if data feeds are not working correctly and data arrives late, determinations of whether components are using accurate inventory data or have missing data due to delays in updating the inventory.

The system described here may capture "intermediate states", e.g. such as when VNF software is being upgraded, it goes from one version ID to the next with a period of time during a transition.

Historical data for a service instance may aid in bill reconciliation (e.g. making sure the correct amount has been billed for the service). The historical data needed may involve attributes that can affect a bill (e.g. service bandwidth) and may entail knowing a duration of each combination of bill-affecting attributes over a period of time. Times when the service was instantiated and when it was "taken down" may also be of interest.

Historical data for a VNF may be used to ensure the VNF vendor has been paid the correct amount per the licensing agreement. In this instance, a duration of each combination of charge-affecting attributes may be needed during an interval of time, or other similar data based on the terms of the license agreement. Data related to the use of license keys and entitlements may also be needed. Historical inventory data for a VNF may also be useful in verifying compliance with a licensing agreement (e.g. if the license only permits use of the VNF in certain geographical regions). Data may be required to be retained for a predetermined time period. Historical data may also include relationships between network elements and path information, which may be used to determine how relationships in the network changed over time.

Companies running VNFs on their own private cloud may use historical inventory data for internal cost allocation or chargebacks of cloud resources, e.g. by tracing an internal organization using a VNF to the underlying cloud resources, such as physical servers and storage, and finding a cumulative usage of the cloud resource per internal organization over a period of time.

Historical inventory data may be used to evaluate reliability of virtualized network elements (e.g. rate of failure of a type of VNF).

It is contemplated herein that in an SDN environment (e.g., an environment in which the typical set of "devices" are white-boxes whose functionality is determined by software enablement), what had previously been described as a "node" takes on a different realization. In an SDN environment, a node may include a single white-box or a cluster (more than one, cooperating or independent) of white-boxes. As such, when the term node is used, a "cluster node" is a potential realization.

Figure 10:
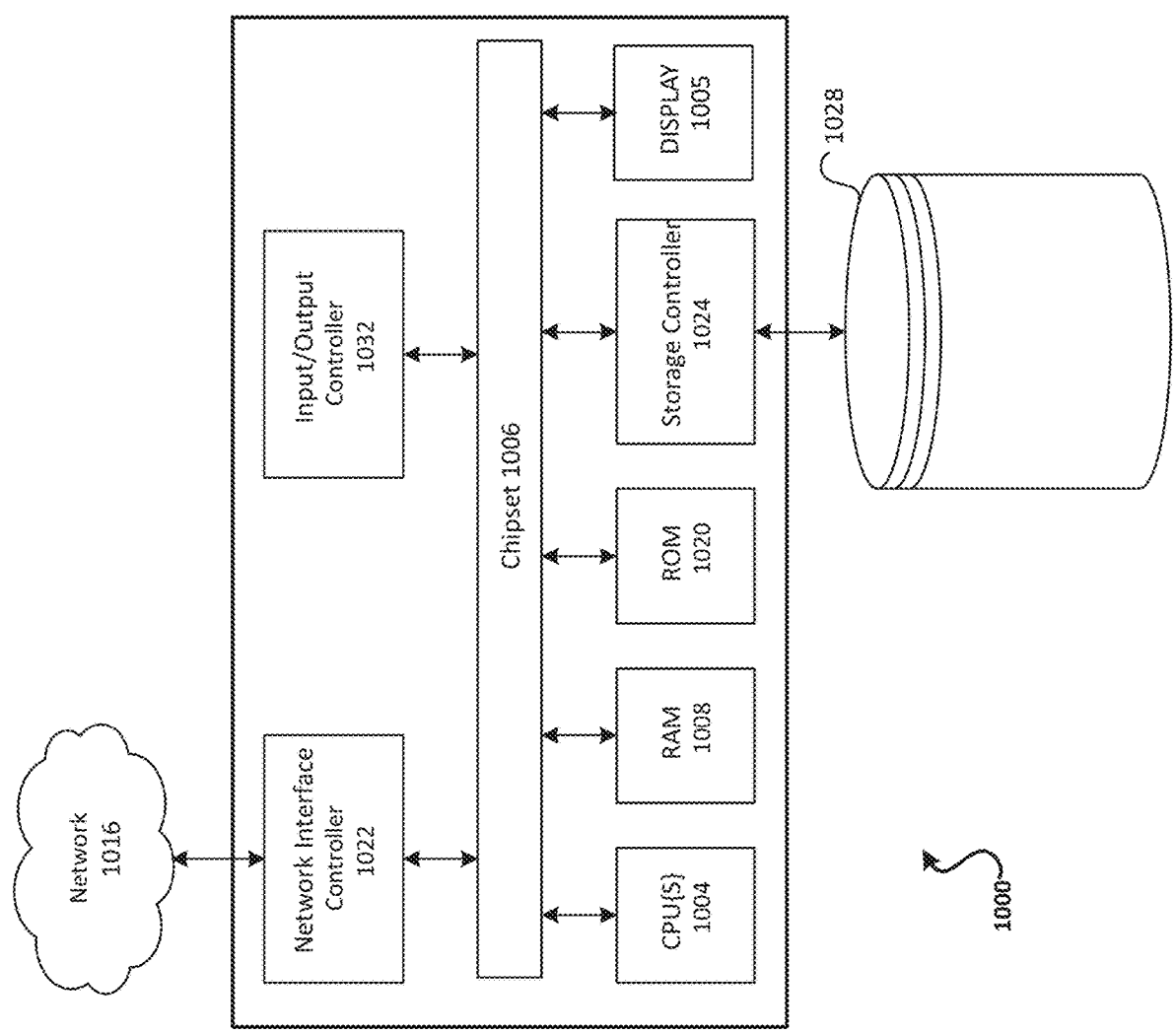
FIG. 10 is a block diagram illustrating an exemplary computing device according to one or more embodiments of the present disclosure.

FIG. 10 depicts a computing device that may be used in various aspects, such as the servers, modules, devices, or interfaces discussed in FIGS. 1-9D, and used to perform method 800. A computer architecture shown in FIG. 10 may illustrate a server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s) 1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s) 1005. The GPU(s) 1005 may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random-access memory (RAM) 1008 used as the main memory in the computing device 1000. The chipset 1006 may further provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems through local area network (LAN) 1016. The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016. It should be appreciated that multiple NICs 1022 may be present in the computing device 1000, connecting the computing device to other types of networks and remote computer systems.

The computing device 1000 may be connected to a mass storage device 1028 that provides non-volatile storage for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on a mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 1028 by detecting the physical states or characteristics of one or more particular locations within the physical storage units.

In addition to the mass storage device 1028 described above, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described above. The computing device 1000 may have access to computer-readable storage media storing computer-executable instructions, which, when executed by the computing device 1000, may perform methods described herein.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display 1005, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine As described above, the exemplary embodiments can be in the form of processor-implemented processes and devices for practicing those processes, such as a server in a regional network or cloud data center. The exemplary embodiments may be embodied as either centralized or distributed hardware and software. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

This written description uses examples to enable any person skilled in the art to practice the claimed subject matter, including making and using any devices or systems and performing any incorporated methods. Other variations of the examples are contemplated herein. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced items.

What is claimed:

1. An apparatus comprising:
a processing system including a processor; and
a memory coupled with the processing system, the memory storing executable instructions that, when executed by the processing system, facilitate performance of operations comprising:
instantiating at least one analytics application configured for processing collected data;
storing the collected data as historical data, wherein the historical data comprises a plurality of values for a performance attribute for one or more network elements in which each value of the plurality of values is associated with a respective information timestamp and historical timestamp;
storing the information timestamp and the historical timestamp for each value of the plurality of values, wherein the information timestamp indicates a storing time at which the value was stored and the historical timestamp indicates a historical time at which the value became true;
filtering the historical data based on a query, wherein the query is associated with analytics relating to the one or more network elements and comprises a designated time;
deriving values for the one or more network elements at a designated time based on the filtered historical data using at least the respective information timestamps and the historical timestamps;
based on the derived values, providing a query result to the at least one analytics application, wherein the query result comprises a sequence of events associated with each of the plurality of values for the performance attribute for the one or more network elements, the sequence of events indicated by the historical timestamps associated with respective values of the plurality of values; and
determining, based on the information timestamps associated with the respective values of the plurality of values, that a first value of the plurality of values was stored out of sequence with respect to a second value, the first value being stored with a first historical timestamp indicating an earlier time than a second historical timestamp of the second value and with a first information timestamp indicating a later time than a second information timestamp of the second value,
wherein, in accordance with the first value being stored with the first storing the information timestamp and the first historical timestamp and the second value being stored with the second information timestamp and the second historical timestamp, is the first value and the second value are stored without overwriting existing data for the performance attribute.

2. The apparatus of claim 1, wherein the operations further comprise:
  determining that a problem in a network comprising the one or more network elements has occurred based on the query result;
  troubleshooting the network to identify a problem in one or more data flows in the network or identifying a problem in one or more data flows from a data source to a database based on the query result; and
  remediating the identified problem.

3. The apparatus of claim 1, wherein the filtering comprises time filtering the historical data to obtain a history of the one or more network elements between a first time and a second time.

4. The apparatus of claim 1, wherein the filtering comprises age filtering to identify values not needed for the query.

5. The apparatus of claim 1, wherein the operations further comprise determining a time interval between the historical timestamp and the information timestamp.

6. The apparatus of claim 1, wherein the operations further comprise determining whether data associated with the query result is valid based on the historical data available.

7. The apparatus of claim 6, wherein the respective information timestamps are used to indicate that data is not valid.

8. The apparatus of claim 1, wherein the plurality of values for the attribute are stored as consecutive lines of text.

9. The apparatus of claim 1, wherein the respective historical timestamps are used to store each of the plurality of values in reverse chronological order.

10. The apparatus of claim 1, wherein the operations further comprise evaluating a reliability for each of the one or more network elements using the historical data.

11. A method comprising:
  storing, by a processing system including a processor, collected data as historical data, wherein the historical data comprises a plurality of values for a performance attribute for one or more network elements in which each value of the plurality of values is associated with a respective information timestamp and historical timestamp;
  storing, by the processing system, the information timestamp and the historical timestamp for each value of the plurality of values, wherein the information timestamp indicates a storing time at which the value was stored and the historical timestamp indicates a historical time at which the value became true;
  filtering, by the processing system, the historical data based on a query, wherein the query is associated with analytics relating to the one or more network elements and comprises a designated time;
  deriving, by the processing system, values for the one or more network elements at a designated time based on the filtered historical data using at least the respective information timestamps and the historical timestamps;
  based on the derived values, providing, by the processing system, a query result to at least one analytics application, wherein the query result comprises a sequence of events associated with each of the plurality of values for the performance attribute for the one or more network elements, the sequence of events indicated by the historical timestamps associated with respective values of the plurality of values; and
  determining, by the processing system based on the information timestamps associated with the respective values of the plurality of values, that a first value of the plurality of values was stored out of sequence with respect to a second value, the first value being stored with a first historical timestamp indicating an earlier time than a second historical timestamp of the second value and with a first information timestamp indicating a later time than a second information timestamp of the second value,
  wherein, in accordance with the first value being stored with the first information timestamp and the first historical timestamp and the second value being stored with the second information timestamp and the second historical timestamp is the first value and the second value are stored without overwriting existing data for the performance attribute.

12. The method of claim 11 further comprising:
  determining, by the processing system, that a problem in a network comprising the one or more network elements has occurred based on the query result;
  troubleshooting, by the processing system, the network to identify a problem in one or more data flows in the network or identifying a problem in one or more data flows from a data source to a database based on the query result; and
  remediating, by the processing system, the identified problem.

13. The method of claim 11, wherein the filtering comprises time filtering the historical data to obtain a history of the one or more network elements between a first time and a second time.

14. The method of claim 11, wherein the filtering comprises age filtering to identify values not needed for the query.

15. The method of claim 11, further comprising determining, by the processing system, a time interval between the historical timestamp and the information timestamp.

16. The method of claim 11 further comprising determining, by the processing system, whether data associated with the query result is valid based on the historical data available.

17. The method of claim 16, wherein the respective information timestamps are used to indicate that data is not valid.

18. The method of claim 11, wherein the plurality of values for the attribute are stored as consecutive lines of text.

19. The method of claim 11, wherein the respective historical timestamps are used to store each of the plurality of values in reverse chronological order.

20. A non-transitory computer readable medium comprising executable instructions that, when executed by a processing system including a processor, facilitate performance of operations comprising:
  instantiating at least one analytics application configured for processing collected data;
  storing the collected data as historical data, wherein the historical data comprises a plurality of values for an attribute in which each value of the plurality of values is associated with a respective information timestamp and historical timestamp;
  storing the information timestamp and the historical timestamp for each value of the plurality of values, wherein the information timestamp indicates a storing time at which the value was stored and the historical timestamp indicates a historical time at which the value became true;

filtering the historical data based on a query, wherein the query is associated with analytics relating to the one or more network elements and comprises a designated time;

deriving values for one or more network elements at a designated time based on the filtered historical data using at least the respective information timestamps and the historical timestamps;

based on the derived values, providing a query result to the at least one analytics application, wherein the query result comprises a sequence of events associated with each of the plurality of values for the performance attribute for the one or more network elements, the sequence of events indicated by the historical timestamps associated with respective values of the plurality of values; and determining, based on the information timestamps associated with the respective values of the plurality of values, that a first value of the plurality of values was stored out of sequence with respect to a second value, the first value being stored with a first historical timestamp indicating an earlier time than a second historical timestamp of the second value and with a first information timestamp indicating a later time than a second information timestamp of the second value, wherein, in accordance with the first value being stored with the first information timestamp and the first historical timestamp and the second value being stored with the second information timestamp and the second historical timestamp, is stored without overwriting existing data for the performance attribute.

* * * * *